(12) United States Patent
Corda et al.

(10) Patent No.: US 12,277,808 B2
(45) Date of Patent: Apr. 15, 2025

(54) ASSET INSPECTION ASSISTANT

(71) Applicant: Bridgestone Mobility Solutions B.V., Amsterdam (NL)

(72) Inventors: Andrea Corda, Barcelona (ES); Gianfranco Santoro, Barcelona (ES)

(73) Assignee: Bridgestone Mobility Solutions B.V., Amsterdam (NL)

( * ) Notice: Subject to any disclaimer, the term of this patent is extended or adjusted under 35 U.S.C. 154(b) by 192 days.

(21) Appl. No.: 17/894,048

(22) Filed: Aug. 23, 2022

(65) Prior Publication Data
US 2023/0054982 A1 Feb. 23, 2023

(51) Int. Cl.
*G07C 5/00* (2006.01)
*G07C 5/08* (2006.01)

(52) U.S. Cl.
CPC .............. *G07C 5/006* (2013.01); *G07C 5/008* (2013.01); *G07C 5/0808* (2013.01); *G07C 5/0825* (2013.01)

(58) Field of Classification Search
CPC ...... G07C 5/006; G07C 5/008; G07C 5/0808; G07C 5/0825
See application file for complete search history.

(56) References Cited

U.S. PATENT DOCUMENTS

| | | | |
|---|---|---|---|
| 10,607,084 B1 * | 3/2020 | Tang | G06F 16/7837 |
| 2002/0007237 A1 | 1/2002 | Phung et al. | |
| 2008/0065288 A1 | 3/2008 | Shumate | |
| 2009/0265118 A1 * | 10/2009 | Guenther | G06Q 10/06 702/34 |

(Continued)

FOREIGN PATENT DOCUMENTS

| | | |
|---|---|---|
| EP | 3605412 A1 | 2/2020 |
| WO | 2006047266 A1 | 5/2006 |

(Continued)

OTHER PUBLICATIONS

International Search Authority: European Search Report for corresponding EP Patent Application No. EP 21 38 2778 dated Jan. 20, 2022, 8 pages.

(Continued)

*Primary Examiner* — Hussein Elchanti
(74) *Attorney, Agent, or Firm* — Patterson Intellectual Property Law, PC

(57) ABSTRACT

A system for identifying likely defects with an asset within a fleet of assets comprises sensors to detect asset sensor data, user input devices/user output terminals associated with the plurality of assets, and a server device. The server device collects historical data comprising historical asset sensor data generated by the sensors and historical inspection report data from the user input devices. The server device further uses an algorithm to identify correlations in the historical data, obtains current asset sensor data generated by sensors on a given asset and/or obtains current inspection report data from a user input device associated with the given asset, calculates one or more likely defects with the asset based on the identified correlations, and based on the current asset sensor data and/or the current inspection report data, and sends the calculated likely defects to user output terminal associated with the given asset for display thereof.

20 Claims, 11 Drawing Sheets

(56) References Cited

U.S. PATENT DOCUMENTS

| | | |
|---|---|---|
| 2010/0063668 A1 | 3/2010 | Dost et al. |
| 2013/0124032 A1 | 5/2013 | Singh et al. |
| 2015/0121275 A1* | 4/2015 | Marshall ............... G07C 5/008 |
| | | 715/771 |
| 2016/0086391 A1 | 3/2016 | Ricci |
| 2016/0093119 A1* | 3/2016 | Ahn ..................... G07C 5/006 |
| | | 701/29.3 |
| 2017/0024943 A1 | 1/2017 | Wodecki et al. |
| 2018/0197355 A1 | 7/2018 | Remboski |
| 2020/0320806 A1* | 10/2020 | Manchanda ........... G08G 1/202 |
| 2021/0192405 A1* | 6/2021 | Bristow ............... G08G 5/0069 |
| 2024/0102683 A1* | 3/2024 | Aschow ................. F25B 45/00 |

FOREIGN PATENT DOCUMENTS

| | | |
|---|---|---|
| WO | 2018175999 A1 | 9/2018 |
| WO | 2021042195 A1 | 3/2021 |

OTHER PUBLICATIONS

Office Action for counterpart application GB 2212273.3, Feb. 22, 2023, 6 pages.

\* cited by examiner

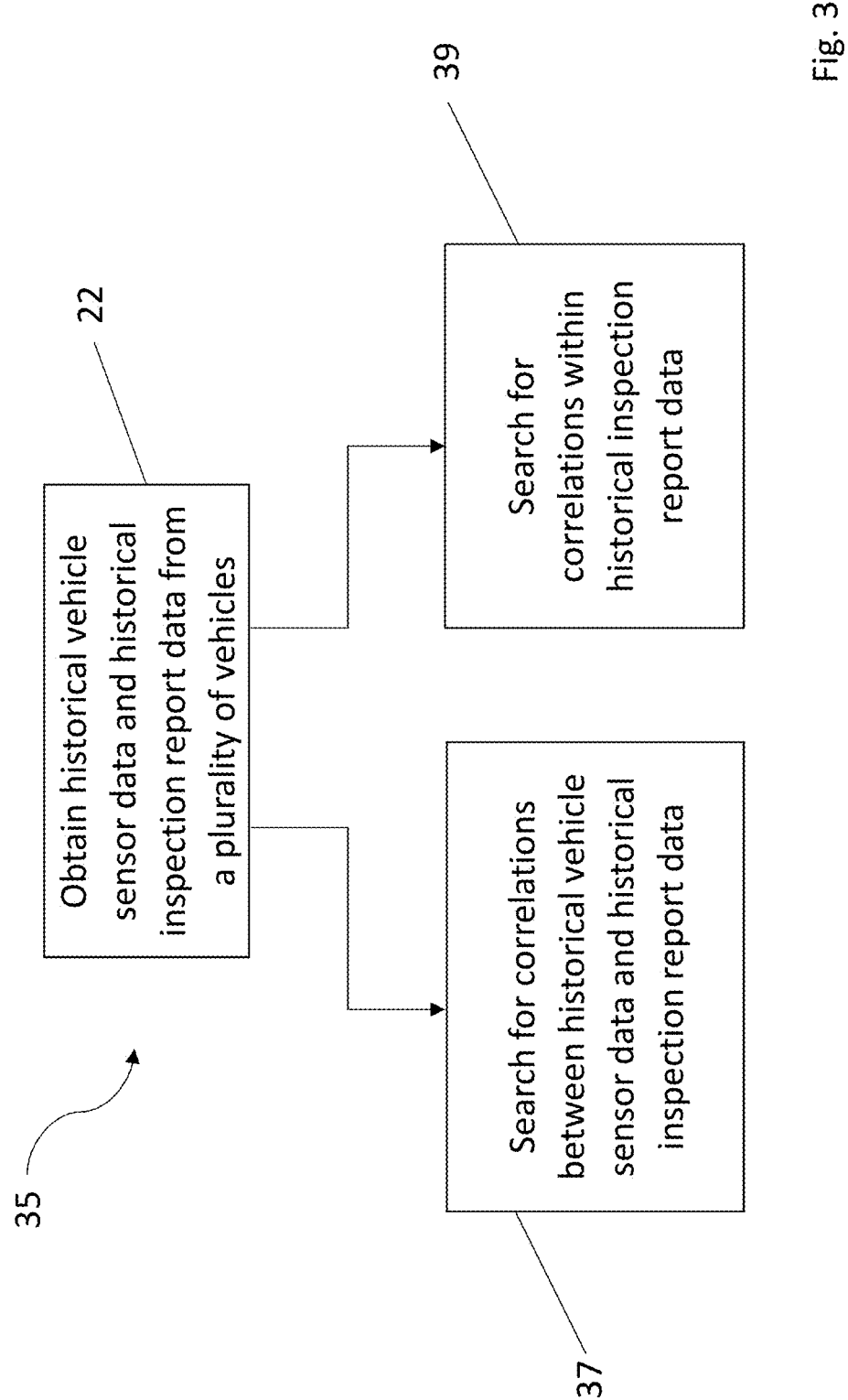

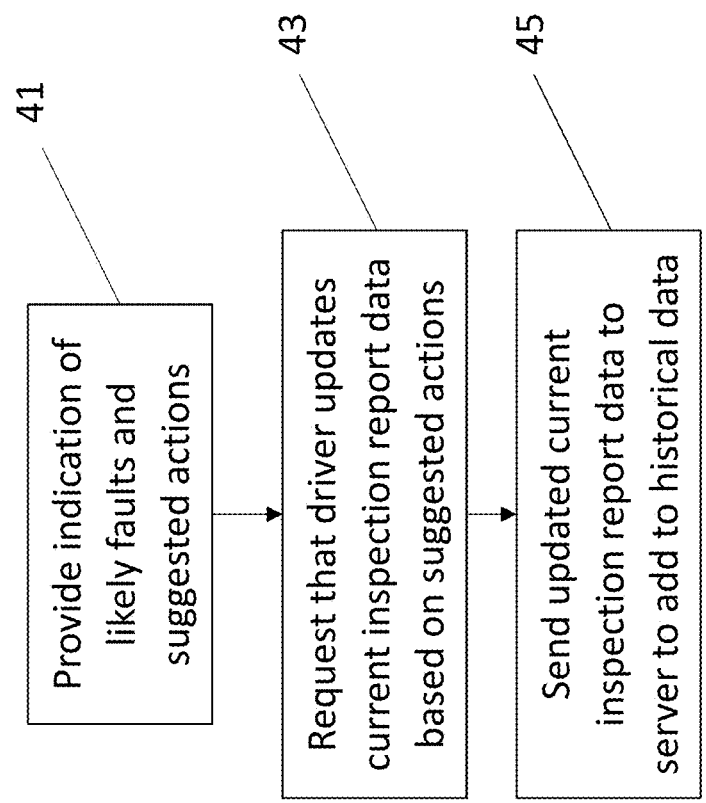

Daily Checklist 50

- Engine oil
  1 defect
- Fuel
- Battery
- Wheel rim & nuts
- Tyres
  1 defect
- Head/stop lights
- Tail/dash lights
- Turn indicators
- Excessive engine exhaust smoke
- Doors and exits Cancel  Confirm

Daily Checklist 50

- ABS/EBS
- Warning lamps/MIL
- Seat belts
- Seat
- Heating/Ventilation
- Exterior check
- Engine oil
  1 defect
- Fuel
- Battery
- Wheel rim & nuts
- Tyres
  1 defect
- Head/stop lights

Fig. 5

ASSET INSPECTION ASSISTANT

CROSS-REFERENCES TO RELATED APPLICATIONS

This application claims benefit of European Patent Application No. 21382778.5, filed Aug. 23, 2021, and which is hereby incorporated by reference.

FIELD OF THE INVENTION

The present invention relates generally to systems and methods for assisting with asset inspection and/or for identifying likely defects with an asset within a fleet of assets. More particularly, the present invention relates to systems and methods for assisting with vehicle inspection and/or for identifying likely defects with a vehicle within a fleet of vehicles.

BACKGROUND

In most countries, users of assets such as power generators, trailers, machinery, or commercial vehicles are required by law and/or company policies to complete a checklist periodically or before using an asset to check for defects with the asset. This process is extremely important for the safety of the users, employees and, when the asset is a vehicle, passengers, and other road users.

At present users perform the checks basing their considerations predominantly on their previous experience and on visible defects. This approach however introduces a high degree of human error. In particular, commercial vehicle drivers are often under significant time pressure as a result of demanding schedules. As a result, it is not uncommon for users/drivers to perform less than thorough checks, or to skip some checklist items in order to reduce inspection time and help them keep to schedule. Clearly, such an approach compromises safety, and so there is a need for improved ways to perform asset checks.

BRIEF SUMMARY

According to a first aspect of the present invention, there is provided a system for identifying likely defects with an asset within a fleet of assets, the system comprising one or more sensors configured to detect asset sensor data of the fleet of assets, one or more user input devices associated with said plurality of assets configured to receive inspection report data of the fleet of assets, one or more user output terminals associated with said plurality of assets, and a server device. The server device may be configured to collect historical data comprising historical asset sensor data generated by the one or more sensors on the fleet of assets and historical inspection report data from the one or more user input devices associated with the fleet of assets, use an algorithm to identify correlations in the historical data, obtain current asset sensor data from the one or more sensors on a given asset within the fleet of assets and/or obtain current inspection report data from a user input device associated with a given asset within the fleet of assets, calculate one or more likely defects which may be present on the given asset based on the identified correlations in the historical data, and based on the current asset sensor data and/or the current inspection report data, and send said one or more likely defects to a user output terminal associated with the given asset. Said user output terminal may be configured to display an indication of said one or more likely defects.

The asset sensor data, both historical and current, generated by one or more sensors may possibly be obtained by the server device directly from the one or more sensors. However, the asset sensor data may be obtained by the server device from a telematics device installed on the or each asset within the fleet of assets. Thus the server device may be configured to communicate with a telematics device installed on an asset within the fleet of assets to obtain current asset sensor data generated by one or more sensors on the asset. The system may therefore further comprise a telematics device installed on the (or each) asset within the fleet of assets. In such embodiments, the telematics device may obtain the asset sensor data directly from the one or more sensors, or the telematics device may obtain the asset sensor device from an asset computer, installed on the or each asset, which obtains the asset sensor data from the one or more sensors. Alternatively, in some embodiments, the server device may obtain the asset sensor data from an asset computer, installed on the or each asset, which obtains the asset sensor data from the one or more sensors—i.e. without the need for a separate telematics device.

A telematics device as disclosed herein will be understood to include at least the necessary electronic components to enable a telematics function. The telematics device includes a wireless transceiver arranged to communicate with the server device. As the present invention relates to a system for identifying likely defects with an asset within a fleet of assets, e.g. for fleet management, the assets can move around independently of one another and the server device is necessarily remote from the assets. In various embodiments, the telematics device may comprise a location sensor, such as a GPS receiver (or any other global navigation satellite system (GNSS) receiver, or equivalent location-determining device), and a processor arranged to obtain location data based on measurements from the location sensor. Further electronic components, such as an acceleration sensor or inertial measurement unit, may optionally be included in the telematics device.

In those embodiments wherein a telematics device is installed on the or each asset within the fleet of assets, it will be understood that the telematics device may operate independently of the vehicle engine control unit (ECU) to obtain the asset sensor data from the one or more sensors. In some embodiments, the telematics device is a mobile device installed on the asset. In some other embodiments, the telematics device is a fixed device installed on the asset, for example plugged into an On-Board Diagnostics (OBD) port (e.g. where the asset is a vehicle). The fixed device may include mechanical and/or electrical mounting means (e.g. for connecting to the power supply from an onboard battery). The telematics device being a fixed device means that it is not intended to be regularly removed and carried by a user in the form of a mobile device, however the fixed device may still be installable and removable rather than being a permanent fixture of the asset. In other words, the telematics device may be manufactured by a third party and installed on an asset subsequent to its manufacture, for example as part of a fleet management system. The telematics device can therefore be distinguished from any onboard data processing systems installed by the asset (e.g. vehicle) manufacturer. In various examples, the telematics device may be one of the LINK tracking devices available from Webfleet Solutions B.V.

It will be appreciated that using this system, potential likely defects are identified using patterns recognized in historical data from a fleet of assets, the historical data comprising both asset sensor data acquired from sensors on the assets in the fleet, and inspection report data detailing defects that have been reported by users in the past. Likely defects are potential defects which warrant inspection to confirm whether or not an actual defect is present. Using this system, defects that may otherwise be missed by a human inspector such as a user completing an asset checklist, can be identified, improving safety. Further, since the system indicates likely defects to the user, the user can focus their inspection time on checklist items which are indicated as likely to be defective, thus enabling them to use their limited time more efficiently, saving time without compromising safety.

The algorithm may be trained to identify correlations in the historical data. In various embodiments, the algorithm is trained to recognize correlations in the historical data arising from patterns detected in the historical asset sensor data and/or historical inspection report data. In some embodiments, the algorithm is trained to search for correlations between data points in the historical asset sensor data and data points in the historical inspection report data. The algorithm may therefore detect when certain asset sensor data (such as a tire sensor reading from a vehicle) tends to occur at the same time as certain inspection report data (such as a steering malfunction on the vehicle).

In some embodiments, in addition or alternatively, the algorithm is trained to search for correlations within the historical inspection report data itself. For example, in searching for correlations, the algorithm may be trained to recognize checklist items which are frequently reported as defective by a user simultaneously.

In embodiments, the algorithm may be trained to look only for one of the two types of correlations discussed above. For example, the algorithm may be trained only to search for correlations between historical asset sensor data and historical inspection report data, or the algorithm may be trained only to search for correlations within the historical inspection report data.

In a set of embodiments, the displayed indication of a likely defect on the user output terminal may be in the form of an alert icon on a checklist item, or may be in the form of a written notification. In a set of embodiments, the displayed indication of a likely defect on the user output terminal may be in the form of a prioritised checklist item (e.g. for the inspection report data). The user output terminal may itself decide how to display the indication of a likely defect. However, as is described further below, it may be preferable for the user output terminal to be provided with an appropriate display template by the server device.

In some embodiments, each user input device comprises a user output terminal. In some embodiments, the user input device associated with the given asset comprises said user output terminal associated with the given asset. The user input device may be a custom device, alternatively, the user input device may be a smart phone with an application installed thereon.

In some embodiments, the user may be presented with a pre-set checklist (e.g. template) for the inspection report data which may be created based on legislation and/or company policy. The checklist may be ordered in any suitable way, for example, the checklist may simply be alphabetically ordered. The pre-set checklist may further be based on current asset sensor data, and on the correlations recognized from the historical asset sensor data and the historical inspection report data. Such a pre-set checklist may be presented to a user at the user output terminal before the user has started to perform an asset inspection, since no current inspection report data has been collected at this point. Each checklist item may be considered to be a suggested action, with the suggested action being to perform an inspection of the asset component corresponding to the checklist item. The checklist for the inspection report data may be a prioritised checklist, with checklist items relating to more likely and/or more severe possible defects being presented first. The pre-set checklist may be updated with new checklist items as the user enters current inspection report data, for example if the algorithm determines a new likely defect based on the current inspection report data, a checklist item corresponding to the likely defect may be added to the checklist. This updating of the checklist being displayed for the inspection report data may take place locally at the user input device. However, it may be preferred for the user input device to require relatively little processing capability and instead rely on the server device to update the checklist being displayed for the inspection report data.

In various embodiments, the server device is configured to select a display template from a memory of the server device based on said one or more likely defects and send the display template to the user output terminal, wherein the display template prioritises the display of one or more checklist items in the inspection report data dependent on said one or more likely defects. This means that the likely defects are not directly indicated but rather used to inform selection of an appropriate display template for the inspection report data. Since the display template prioritises certain checklist items in the inspection report data, a user is led to prioritise entry of the most relevant inspection report data by focusing on these checklist items. Even if the user loses concentration or fails to complete an inspection report, it is still likely that entering data for the prioritised checklist items will pick up any likely defects. The system is therefore intelligent enough to compensate for poor user input of current inspection report data. Additionally or alternatively, in embodiments, the template prioritises one or more checklist items dependent on the severity of said one or more likely defects.

According to a second aspect of the present invention, there is provided a system for assisting asset inspection within a fleet of assets, the system comprising one or more sensors configured to detect asset sensor data of the fleet of assets, one or more user input/output devices associated with said plurality of assets configured to receive inspection report data of the fleet of assets, and a server device. The server device may be configured to collect historical data comprising historical asset sensor data generated by the one or more sensors on the fleet of assets and historical inspection report data from the one or more user input devices associated with the fleet of assets, use an algorithm to identify correlations in the historical data, obtain current asset sensor data from the one or more sensors on a given asset within the fleet of assets and/or obtain current inspection report data from a user input device associated with a given asset within the fleet of assets, calculate one or more likely defects which may be present on the given asset based on the identified correlations in the historical data, and based on the current asset sensor data and/or the current inspection report data, and select a display template from a memory of the server device based on said one or more likely defects and send the display template to the user input/output device associated with the given asset, wherein the display template prioritises the display of one or more checklist items in the inspection report data dependent on said one or more likely defects.

As discussed above, this means that the display template received at the user input/output device can be selected to intelligently prioritise one or more checklist items for the inspection report data based on the calculated likely defects. The user input/output device may be configured to use the selected display template when current inspection report data is being input.

The display template may be updated by the server device sending a replacement display template based on the current inspection report data and/or current asset sensor data received. In some examples, the display template is dynamically updated by the server device as new current inspection report data is received. In some examples, in addition or alternatively, the display template is be dynamically updated by the server device as new current asset sensor data is received.

The display templates stored in the memory of the server device may be updated by the algorithm, e.g. periodically or continuously, based on the identified correlations in the historical data and/or on the current inspection report data. For example, this means that a standard template can be updated over time to reflect the inspection report data being collected in the field for a given fleet of assets.

In some embodiments, the server device is configured to calculate a suggested action based on said one or more likely defects, and send the suggested action to the user output terminal associated with the asset based on said one or more likely defects. The user output terminal is configured to display the suggested action. A suggested action may be an instruction to check the condition of an asset component, or to take additional sensor readings. Suggested actions may also be instructions to take more immediate steps such as scheduling servicing or maintenance, or an instruction not to use the asset.

In a set of embodiments, the server device is configured to calculate a prioritized list of suggested actions to be provided at the user output terminal based on said one or more likely defects. Such a prioritized list may be presented to the user one suggested action at a time, with the highest priority actions being presented first. Alternatively, the prioritized suggested actions may be presented together in an ordered list. The priority order may be decided for example on the severity of the likely defect. For example, if a defect would render the asset unusable, or for example, if a defect with a vehicle would render the vehicle non-roadworthy, then this defect would be presented first, whilst a minor defect which may require future servicing but does not cause an immediate problem would be presented later.

In further embodiments, the suggested actions may be presented as a prioritized list, e.g. based on a selected template.

The prioritized suggested action list may be updated as the user enters current inspection report data, for example if the algorithm determines a new likely defect based on the current inspection report data and/or current asset sensor data.

In a set of embodiments, the suggested action is for the user to inspect one or more components on the asset and update the current inspection report data at the user input device.

In embodiments where an indication of a likely defect has been provided at the user output terminal, the system may request (e.g. via the user output terminal) that the user inspect the indicated likely defect, and that a confirmation that said likely defect has been inspected is given at the user input device.

In a preferred set of embodiments, the user input device comprises the user output terminal.

In embodiments, one or more of the sensors is a smart sensor, and the server device is configured to instruct a smart sensor associated with an asset component related to a likely defect to (e.g. automatically) provide sensor data to the server device to verify the current condition of the asset component.

The fleet of assets may be a fleet of vehicles of the same type and/or belonging to the same fleet operator, such as a fleet of heavy trucks operated by a haulage firm. Alternatively, the plurality of assets may be made up of assets from a plurality of different fleets, e.g. operated by different firms. For example, users of the present invention may pool the historical data from their assets into a single historical data set. In a set of embodiments where the assets are vehicles, the plurality of vehicles are all of the same vehicle type. Vehicle type may be defined for example in terms of categories such as, motorbikes, cars, vans, minibuses, buses, ultra-light trucks, very light trucks, light trucks, medium trucks, heavy trucks, and off-road trucks. Limiting the plurality of vehicles to a single vehicle type may increase the efficiency of the training process, and lead to more accurate defect predictions. In some embodiments the historical data may be collected from a plurality of vehicles of the same type but from different vehicle manufacturers. The algorithm may recognize correlations in the historical data which are agnostic to vehicle manufacturer.

The asset sensor data may comprise data in any suitable form which is collected by sensors on board the asset. Such sensors may be integral with the asset, or contained within a separate telematics device carried by the asset. However, in a set of embodiments, the asset sensor data comprises diagnostic trouble codes (DTC) s as specified by one or more asset manufacturers to identify asset defects.

The inspection report data may comprise data in any suitable form which is collected from users of the asset. In a preferred set of embodiments, the inspection report data comprises responses input by the user whilst filling out an asset inspection checklist as discussed above.

In a set of embodiments, the server device is configured to group the asset sensor data according to an asset component to which the asset sensor data relates. In embodiments where the asset sensor data comprises DTCs, the grouping may comprise grouping DTCs according to the asset component to which the DTC relates.

Further, in embodiments, the server device is configured to group the inspection report data according to an asset component to which the inspection report data relates. In embodiments where the inspection report data comprises checklist response, the grouping may comprise grouping checklist items according to the asset component to which the checklist item relates.

In embodiments, both the inspection report data and the asset sensor data are grouped according to the asset component to which the data relates, alternatively, only one of the inspection report data or the asset sensor data may be grouped as discussed above. Further, the grouping step may apply only to the historical data, but in a preferred set of embodiments, both the historical data (asset sensor, inspection report, or both) and the current data (asset sensor, inspection report, or both) are grouped as discussed above.

In embodiments, the requested confirmation comprises the user providing a further input, at the user input device, verifying the current condition of an asset component related to the likely defect. Such further inputs may comprise taking a photograph of the asset component and uploading it at the user input device. This photograph may then be reviewed automatically, or be sent, by the server, to a fleet operator who may review the photograph. Alternatively, the user may be requested to take a manual reading of a sensor or gauge relating to the asset component, such as a tire pressure reading, or a tire tread depth gauge reading, and input the reading at the user input device. In embodiments, the reading of a sensor or gauge relating to the asset component may be taken automatically by means of smart sensors transferring data directly to the user input device. Such embodiments may remove the need for the user to perform a manual reading to verify the current condition of an asset component related to a likely defect which may save time. It is further envisaged that the user may be requested to scan an ID code, such as a QR code or RFID code, which is present on or near the asset component to confirm that the user has visited the location of the asset component to perform a check. In embodiments, for example in embodiments where the user input device is a smart phone, it may be possible for the user to perform such a scan directly with the user input device.

In various embodiments, the server device is configured to add current asset sensor data and current inspection report data to the historical data; and to train the algorithm to recognize correlations in the added historical data such that the algorithm continues learning to recognize correlations in the historical data. The current inspection report data which is added to the historical data encompasses the inspection report data which was input both before and after any indications and/or suggested actions regarding likely defects were given. For example, when the asset is a vehicle, and the user of the asset is a driver of the vehicle, an inspection report of defective steering may be input which prompts the algorithm to indicate that there is a likely defect with the tires and suggest that the tires are checked. Upon checking the tires, the driver will input whether or not they were defective, and so for the algorithm to continue to effectively learn, both the steering report data (pre-indication) and the tires report data (post-indication) should be added to the historical inspection report data.

In embodiments wherein a display template is selected based on the identified one or more likely defects, the templates stored in the memory of the server device may be updated by the algorithm based on recognized correlations in the added historical data. The display template may therefore evolve to prioritize the checklist items that have been found to correlate most strongly with the likely defects according to the added historical data.

According to a further aspect, there is provided a server for use in a system for identifying likely defects with an asset within a fleet of assets, the server configured to collect historical data, the historical data comprising historical asset sensor data from one or more sensors on the plurality of assets and historical inspection report data from one or more user input devices associated with the plurality of assets, to train an algorithm to recognize correlations in the historical data, to obtain current asset sensor data from an asset within the fleet of assets and current inspection report data from a user input device associated with an asset within the fleet of assets, and to calculate, using the algorithm, one or more likely defects which may be present on the asset based on the correlations in the historical data, and based on the current asset sensor data and/or the current inspection report data.

As mentioned above, the server may be configured to obtain current asset sensor data from a telematics device installed on the or each asset within the fleet of assets. In such embodiments, the server is configured to be in wireless communication with a telematics device installed on the or each asset within the fleet of assets.

It will of course be appreciated that the term 'server' as used herein means a computer or machine (e.g. server device) connected to a network such that the server sends and/or receives data from other devices (e.g. computers or other machines) on that network. Additionally or alternatively, the server may provide resources and/or services to other devices on the network. The network may be the Internet or some other suitable network. The server may be embodied within any suitable server type or server device, e.g. a file server, application server, communications server, computing server, web server, proxy server, etc. The server may be a single computing device, or may be a distributed system, i.e. the server functionality may be divided across a plurality of computing devices. For example, the server may be a cloud-based server, i.e. its functions may be split across many computers 'on demand'. In such arrangements, server resources may be acquired from one or more data centres, which may be located at different physical locations.

It will thus be appreciated that the processes described above which are carried out by the server, may be carried out by a single computing device, i.e. a single server, or by multiple separate computing devices, i.e. multiple servers. For example, all of the processes may be carried out by a single server which has access to all the relevant information needed.

The one or more sensors may comprise one or more sensors which are integral with the asset, and/or one or more sensors contained within a telematics device carried by the asset. In various embodiments, the sensing apparatus may comprise one of the LINK tracking devices available from Webfleet Solutions B.V.

According to a further aspect of the invention, there is provided a computer-implemented method for identifying likely defects with an asset within a fleet of assets, the method comprising collecting, by a server device, historical data comprising historical asset sensor data from one or more sensors on the fleet of assets and historical inspection report data from one or more user input devices associated with the fleet of assets, obtaining current asset sensor data using one or more sensors on a given asset within the fleet of assets and/or collecting current inspection report data using a user input device associated with a given asset within the fleet of assets, calculating, using an algorithm on the server device, one or more likely defects which may be present on the given asset based on correlations in the historical data, and based on the current asset sensor data and/or the current inspection report data, and providing an indication of said one or more likely defects at a user output terminal associated with the given asset.

It will be appreciated that this aspect may (and preferably does) include one or more (e.g. all) of the preferred and optional features disclosed herein, e.g. relating to other aspects and embodiments of the invention, as applicable. For example, the method may further comprise training, by the server device, the algorithm to recognize correlations in the historical data. For example, the method may further comprise displaying an indication of said one or more likely defects at the user output terminal associated with the given asset.

It will be appreciated that in each of the embodiments discussed above, reference to current asset sensor data and current inspection report data is intended to mean data which relates to the asset on which defects are currently being identified, and which may be collected in real time. It will further be understood that data which is collected in real time does not necessarily need to be sent in real time, for example sent from the user input device to the server, or from the one or more sensors on the asset to the server. For example, the current inspection report data may be sent as soon as it is entered at the user input device, or it may be sent only once a checklist has been completed. It will be understood that data which is associated with the asset which is currently being assessed will still be classified as current data, even if there is a delay between the data being collected, and being sent to the server.

In any of the aspects and embodiments disclosed herein, the assets may be movable assets, such as vehicles or assets intended to be coupled to vehicles (e.g. trucks, cars, trailers, caravans, etc.), or non-movable assets such as machinery. In various embodiments the assets are all registered in a remote server as a part of the same fleet. As mentioned above, an asset belonging to a fleet may be distinguished from any other asset (e.g. vehicle or piece of machinery) by having a telematics device installed therein. An asset intended to be coupled to a vehicle may not include its own telematics device but be in communication with the telematics device of the vehicle.

In each of the embodiments discussed above, the assets may be vehicles and the users of said assets may be drivers of the vehicles.

This disclosure relates to identifying likely defects with a vehicle within a fleet of vehicles comprising internal combustion engine vehicles, hybrid vehicles, and/or electric vehicles.

BRIEF DESCRIPTION OF THE SEVERAL VIEWS OF THE DRAWINGS

One or more non-limiting examples will now be described, by way of example only, and with reference to the accompanying figures in which:

FIG. 3 is an overview of a method for training a machine learning algorithm to determine likely defects with a vehicle in accordance with an embodiment of the present invention;

FIG. 4 is an overview of a method for obtaining updated inspection report data;

FIG. 5 shows a checklist displayed on a driver input device;

DETAILED DESCRIPTION

In the illustrated embodiment, the asset is a vehicle 1 within a plurality of vehicles 1. The user of the asset is a driver of the vehicle 1.

Figure 1:
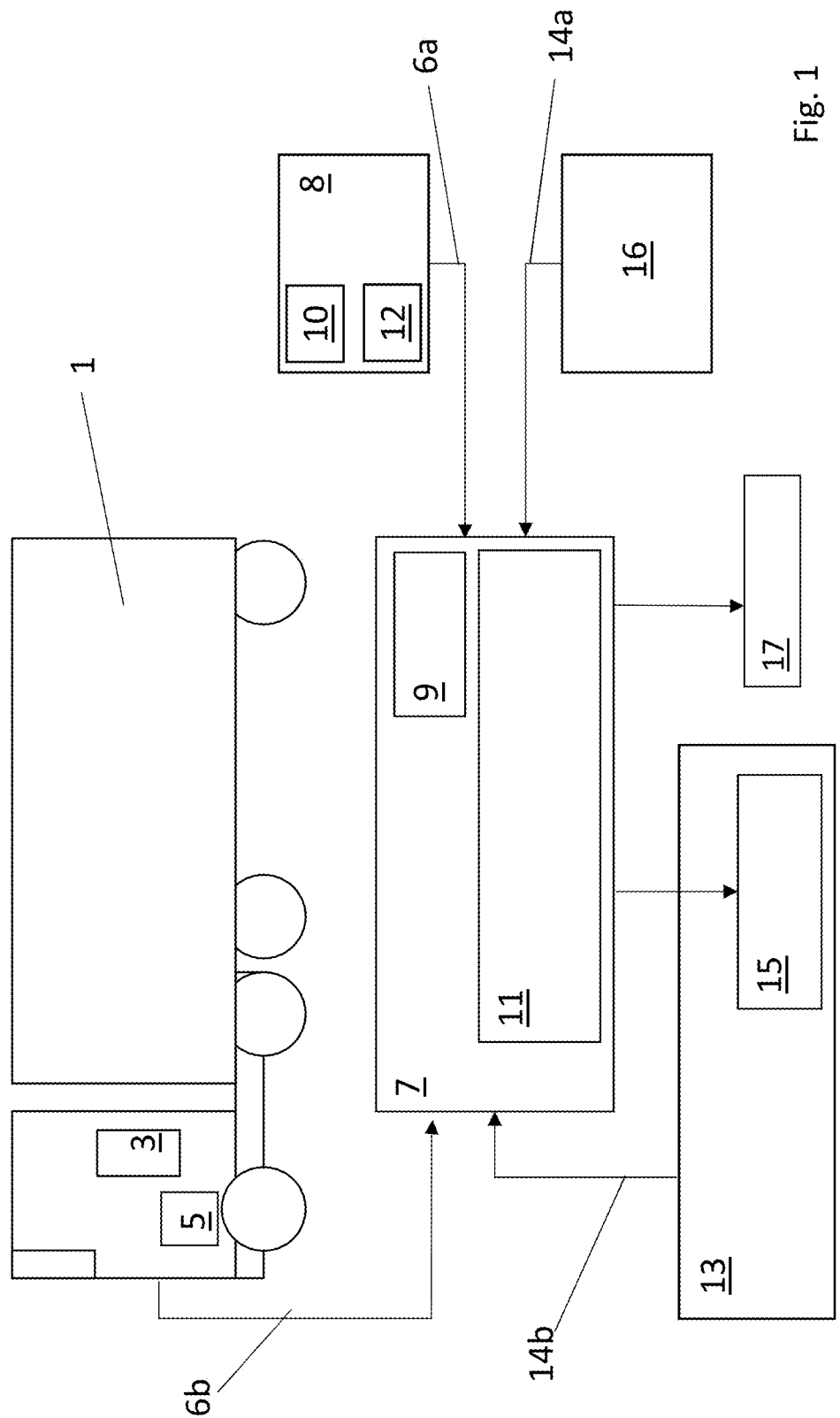
FIG. 1 is a schematic overview of a system for determining likely defects with a vehicle in accordance with an embodiment of the present invention.

FIG. 1 is a schematic overview showing a system 2 for identifying likely defects with a vehicle 1, and providing an indication of those defects to a driver. The vehicle 1 carries a telematics device 3 which may comprise sensors for generating data relating to the vehicle 1. For example, the telematics device 3 may comprise a location sensor, e.g. a GPS sensor, configured to generate positional data relating to the driving of the vehicle 1. The vehicle 1 also comprises a plurality of sensors 5 which are configured to generate data relating to the condition of vehicle components. The plurality of sensors 5 may comprise for example tire pressure sensors, engine temperature sensors, oil pressure sensors, etc. Both the telematics device 3 and the plurality of sensors 5 are configured to generate current asset sensor data which in the illustrated embodiment is current vehicle sensor data 6b and are capable of transmitting current vehicle sensor data 6b to a server 7, either directly or via a separate communication device (not shown).

In the current application, vehicle sensor data is defined as sensor data which contains details about a vehicle, which may include location, speed, idling time, harsh acceleration or braking, fuel consumption, and vehicle defect information such as diagnostic trouble codes (DTCs). The vehicle sensor data is generated by one or more sensors which may be connected to a vehicle data and signals bus such as a Controller Area Network (CAN) bus.

As depicted, the server 7 is located remotely from, and outside of, the vehicle 1. The telematics device 3 may be any device capable of collecting vehicle sensor data. For example, it may be a mobile device, e.g. a mobile phone or tablet computer, carried by a driver of the vehicle 1. Alternatively, the telematics device 3 may be a device that is connected to, or an integral part of, the vehicle 1. For example, the telematics device 3 may be connected to an On-Board Diagnostics (OBD) port of the vehicle 1. The telematics device 3 may be temporarily, or permanently, installed on the vehicle 1. In some examples, the telematics device 3 may comprise one of the LINK tracking devices available from Webfleet Solutions B.V. The plurality of sensors 5 may be an integral part of the vehicle 1.

The server 7 comprises a processor 9 and a memory 11 which store a computer product comprising computer-executable instructions to perform at least part of a method for calculating likely defects with the vehicle 1. The processor 9 may comprise one or more processing devices, for example multiple processing devices arranged in series or parallel. The method for identifying likely defects with the vehicle 1 is shown in FIG. 3 and described in more detail below. The server 7 may comprise a computer readable medium having an algorithm stored thereon.

The system 2 further comprises a user input device associated with the asset, which in turn comprises a user output terminal. In the illustrated embodiment, the user input device is a driver input device 13 associated with the vehicle 1, which in turn comprises a driver output terminal 15. The driver output terminal 15 is used to provide indications of calculated likely defects to a driver, as well as recommended actions. The driver input device 13 is configured to accept inputs from the driver such as current inspection report data 14b about the vehicle 1 and is capable of transmitting current inspection report data 14b, as well as other input data, to the server 7, either directly or via a separate communication device (not shown). The driver input device 13 may be remote from the server 7, and may be a driver's smart phone. Although the driver input device 13 is shown here as a separate device to the telematics device 3, a combined device may be provided.

The system further comprises a plurality of assets which, in the illustrated embodiment, is a fleet of vehicles 8, having a plurality of telematics devices 12 which may themselves each comprise sensors for generating data relating to the fleet of vehicles 8. For example, the plurality of telematics devices 12 may each comprise a location sensor, e.g. a GPS sensor, configured to generate positional data relating to the driving of each vehicle 1 in the fleet of vehicles 8. Each vehicle 1 in the fleet of vehicles 8 also comprises a plurality of the sensors 10, which are configured to generate data across the fleet relating to the condition of one or more vehicle components. The pluralities of sensors 10 may comprise for example tire pressure sensors, engine temperature sensors, oil pressure sensors, etc. Both the telematics devices 12 and the pluralities of sensors 10 are configured to generate historical asset sensor data (which in the illustrated embodiment is historical vehicle sensor data) 6a. In this example, telematics devices 12 are capable of wirelessly transmitting the historical vehicle sensor data 6a to the server 7. The system further comprises a plurality of user input devices associated with the plurality of assets, which in the illustrated embodiment are a plurality of driver input devices 16 associated with the fleet of vehicles 8, configured to accept inputs from drivers such as historical inspection report data 14a about the fleet of vehicles 8. The plurality of driver input devices 16 are capable of transmitting historical inspection report data 14a, as well as other input data, to the server 7, either directly or via a separate communication device (not shown).

The system 2 also comprises a fleet operator output terminal 17 which is used to provide indications of defects to a fleet operator, allowing them to make decisions regarding the roadworthiness of the vehicle 1 or schedule maintenance. The server 7 is configured to receive current inspection report data 14b, as well as other input data, from the driver input device 13, and to send the received data to the fleet operator output terminal 17. Data sent to the fleet operator output terminal 17 may comprise current inspection report data 14b, additional driver notes, photographs and/or sensor readings.

It will be understood that the vehicle 1 may be included in the fleet of vehicles 8, and/or that the driver input device 13 associated with the vehicle 1 may be included in the plurality of driver input devices 16.

Figure 2:
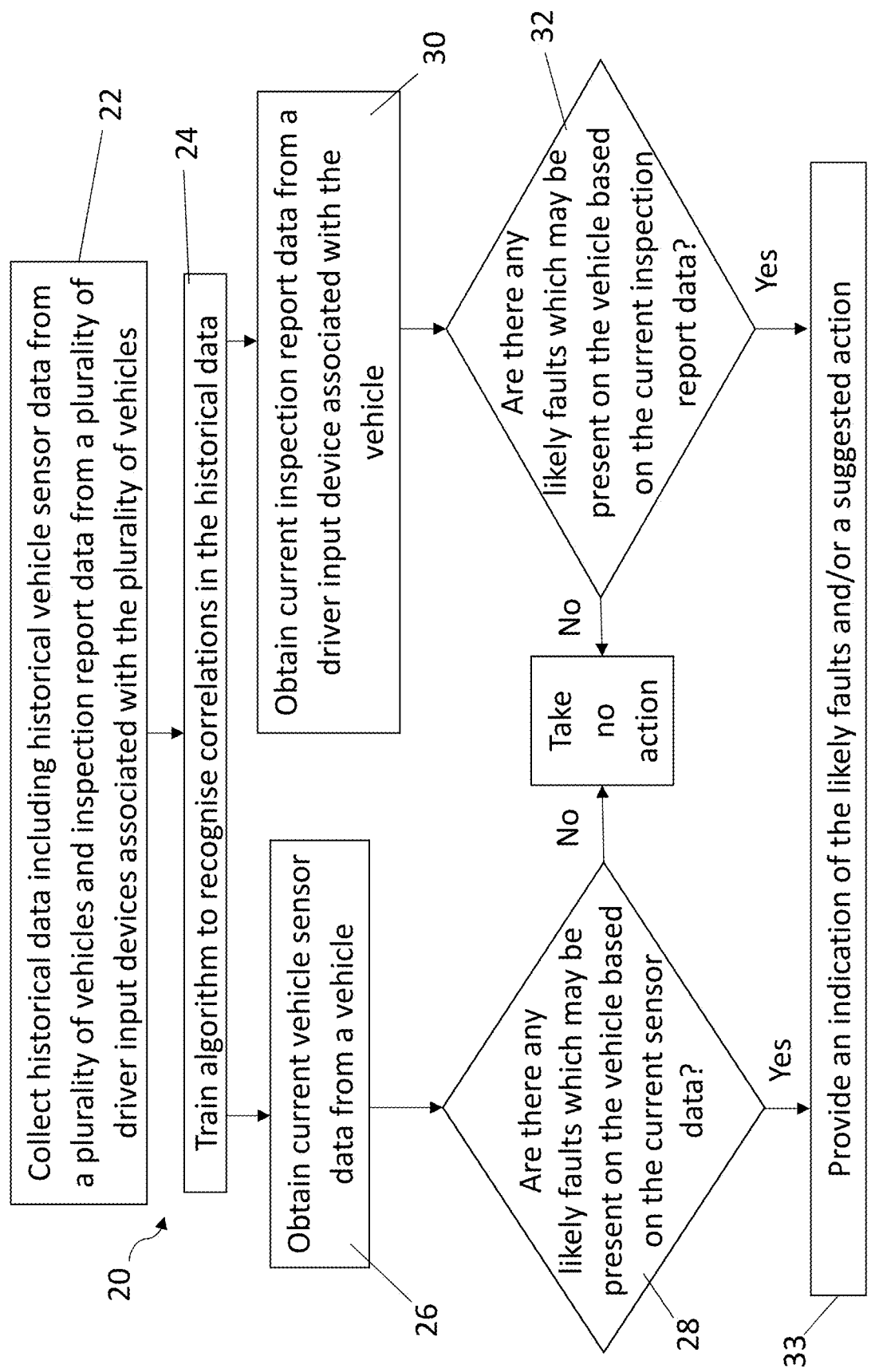
FIG. 2 is a flowchart illustrating a method for determining likely defects with a vehicle in accordance with an embodiment of the present invention.

The plurality of sensors 10 on the fleet of vehicles 8 transmit historical vehicle sensor data 6a to the same remote server 7, and the plurality of driver input devices 16 associated with the fleet of vehicles 8 transmit historical inspection report data 14a to the same remote server 7. Such a system 2 is therefore used to calculate likely defects with a vehicle 1 based on historical vehicle sensor data 6a and historical inspection report data 14a from multiple vehicles in a fleet. In the illustrated embodiment, FIG. 2 is a flow diagram illustrating a method 20 for identifying likely defects with the vehicle 1. The method 20 may, for example, be performed by the system 2 described above, for example it may be partially performed by the server 7, e.g. by the processor 9 of the server 7. At step 22 historical data is collected from the fleet of vehicles 8, which may be a plurality of vehicles 1 in a fleet. The historical data comprises historical vehicle sensor data 6a obtained from the fleet of vehicles 8, for example via the telematics devices 12 and/or directly from the pluralities of sensors 10, and historical inspection report data 14a obtained from the plurality of driver input devices 16.

At step 24, the algorithm is trained on the historical data using known machine learning techniques such as those described in Collaborative Deep Learning for Recommender Systems by Wang et al (https://arxiv.org/pdf/1409.2944.pdf) to recognize correlations in the historical data. FIG. 3 illustrates a training method 33 whereby the algorithm is trained using historical data which comprises historical vehicle sensor data 6a obtained from the telematics devices 12 and/or pluralities of sensors 10 on the fleet of vehicles 8, and historical inspection report data 14a obtained from the plurality of driver input devices 16 associated with the fleet of vehicles 8. The data set needs to be of a significant size, and collected over a significant time span to be considered historical data. For example, a suitable set of historical data may be collected from a fleet of 20 vehicles over a period of 6 months. Alternatively, a suitable set of historical data may be collected from a fleet of 10 vehicles over a period of 12 months.

The historical data may contain data associated with vehicles of a common type, optionally of a common manufacturer, or of a common model. A non-exhaustive list of vehicle types may include: motorbikes, cars, vans, mini-buses, buses, ultra-light trucks, very light trucks, light trucks, medium trucks, heavy trucks, and off-road trucks. In some examples, it may be advantageous to limit the historical data to which the algorithm is exposed to a single vehicle type, manufacturer, and/or model in order to ensure that the calculated likely defects are as relevant and as accurate as possible. The disadvantage of such limitation is the reduction in size of the historical data set as more limits are imposed on the properties of the plurality of vehicles 1. For users who have a fleet of vehicles which is large enough to provide a usable historical data set, the historical data may comprise only data from their fleet of vehicles. Alternatively, where a user does not have a large fleet of vehicles, the historical data set may comprise data associated with vehicles from a plurality of different fleets.

In the illustrated embodiment, the algorithm is trained to look for two types of correlations. At step 37 the algorithm is trained to search for correlations between historical vehicle sensor data 6a, and historical inspection report data 14a. The historical vehicle sensor data 6a may be in the form of diagnostic trouble codes (DTC) s, commonly known as "trouble codes". These trouble codes may be generated by the sensors 10 or reported by OEM integrations directly. The historical inspection report data 14a may be in the form of checklist responses submitted by drivers. As such, in searching for correlations, at step 37 the algorithm may be trained to recognize which DTCs are frequently present when specific checklist items are reported as defective by a driver. As part of the training to recognize which DTCs are frequently present alongside specific checklist items, the algorithm is provided with a mapping matrix to group the DTCs according to the specific vehicle components to which the DTC relates. This mapping matrix could be preset and static, or the mapping matrix may be adaptable (e.g. based on fuzzy logic, certain probability-based rules, learning algorithms, etc.). Table 1 below shows an example of the grouping of DTCs according to the specific vehicle components to which they relate according to a mapping matrix. It will be understood that a "vehicle component" can be any physical component involved in the operation of the vehicle, whether a distinct component (e.g. tires) or distributed (e.g. engine coolant and oil).

TABLE 1

| Trouble codes reported by the LINK device (Can be read from OBD or CAN) | Corresponding vehicle component/checklist item |
|---|---|
| Exhaust related trouble codes P2463: Particulate Filter Restriction-Soot Accumulation Bank 1 P246C: Particulate Filter Restriction-Forced Limited Power Bank 1 509 P2BAC NOx Exceedence-Deactivation of EGR 890 P0420: Catalyst System Efficiency Below Threshold (Bank 1) P0430: Catalyst System Efficiency Below Threshold (Bank 2) | Exhaust |
| P0700: Transmission Control System Malfunction P0702: Transmission Control System Electrical | Engine/Clutch |
| P00B7 Engine Coolant Flow Low/Performance | Engine coolant |
| P0195 Engine Oil Temperature Sensor Malfunction P0196 Engine Oil Temperature Sensor Range/Performance P0197 Engine Oil Temperature Sensor Low P0198 Engine Oil Temperature Sensor High | Engine oil |
| P0460 Fuel Level Sensor Circuit Malfunction P0461 Fuel Level Sensor Circuit Range/Performance P0462 Fuel Level Sensor Circuit Low Input P0463 Fuel Level Sensor Circuit High Input P0464 Fuel Level Sensor Circuit Intermittent | Fuel Level |
| BS, 1094, Different tires (circumference) fitted to an axle Unexpected accelerometer measurement from the axles | Tires |
| Faulty electrical connection P0562 OBD-II: System Voltage Low Diagnostic Trouble Code (DTC) P0561-System voltage-unstable P0560-System voltage malfunction P0563-System voltage-high Unexpected recharging times Faulty recharging cable | Battery/Electric circuit |

Further, a similar approach of a mapping matrix may be applied to the historical inspection report data 14a. In embodiments where the historical inspection report data 14a is in the form of checklist responses, checklist items are typically grouped according to the specific vehicle components to which they relate. These groupings may streamline the training process.

Once the groupings have been applied to the historical vehicle sensor data 6a and/or historical inspection report data 14a, the algorithm is left to train itself to look for correlations between the two data sets 6a, 14a. In this $1^{st}$ type of correlation (step 37), the algorithm is trained to recognize which checklist items are frequently reported together with some DTCs. An example of this $1^{st}$ type of correlation, given below, is a correlation being recognized between the DTC "BS, 7300, Axle modulator of the rear axle is faulty" and the checklist item "Tires". Another example of this $1^{st}$ type of correlation is a correlation being recognized between a trouble code relating to a voltage drop at a particular electric circuit connection or no electric signal, and a given vehicle component on the checklist.

Example of Checklist Items
    External vehicle components
        Tires
        Exhaust
        Windscreen
        Lights
    Daily vehicle checks
        Brakes
        Fuel level
        Engine/clutch
        Steering
    Weekly vehicle checks
        Engine oil
        Engine coolant
        Brake fluid
        Power steering fluid.
        Battery/electric circuit Additionally, or alternatively, at step 39 the algorithm is trained to search for correlations within the historical inspection report data 14a itself. As such, in searching for this $2^{nd}$ type of correlations, at step 39 the algorithm may be trained to recognize checklist items which are frequently reported as defective by a driver simultaneously. An example of this $2^{nd}$ type of correlation, given below, is a correlation being recognized between the checklist items "Tires" and "Steering".

Referring again to FIG. 2, at step 26, current vehicle sensor data 6b is obtained from the vehicle 1. In the present application, current vehicle sensor data 6b is defined as discussed above. This current vehicle sensor data 6a may comprise a list of diagnostic trouble codes (DTC) s. The current vehicle sensor data 6a may be obtained from one or both of the telematics device 3 and the plurality of sensors 5. At step 28, the algorithm calculates whether there are any likely defects which may be present on the vehicle 1 based on the current vehicle sensor data 6b. The algorithm is able to make this calculation based on the correlation training performed on the historical data in step 37 of the training method of FIG. 3.

Alternatively or additionally, at step 30, current inspection report data 14b is obtained from the driver input device 13 associated with the vehicle 1. This current inspection report data 14b may comprise checklist responses submitted by a driver at the driver input device 13. At step 32, the algorithm determines whether there are any likely defects which may be present on the vehicle 1 based on the current inspection report data 14b. The algorithm is able to make this calculation based on the correlation training performed on the historical inspection report data in step 37 and/or step 39 of the training method 35 of FIG. 3.

If the algorithm does not identify any likely defects, then no action regarding the indication of defects is given. If likely defects are identified in either or both of steps 28 and 32, then an indication is provided and/or a suggested action is provided at step 33, e.g. an indication at the driver output terminal 15.

In some examples, the method 20 may comprise obtaining current vehicle sensor data 6b from a vehicle 1 at step 26, and calculating whether there are any likely defects which may be present based on the current vehicle sensor data 6b at step 28, but not comprise obtaining current inspection report data 14b from a driver input device 13 associated with the vehicle 1 at step 30, or calculating whether there are any likely defects which may be present based on the current inspection report data 14b at step 32. This may occur in situations before the driver has started to perform a vehicle inspection, and therefore has not yet input any current inspection report data 14*b* at the driver input device 13.

In further examples, the method 20 may comprise obtaining current inspection report data 14*b* from a driver input device 13 associated with the vehicle 1 at step 30, and calculating whether there are any likely defects which may be present based on the current inspection report data 14*b* at step 32, but not comprise obtaining current vehicle sensor data 6*b* from a vehicle 1 at step 26, or calculating whether there are any likely defects which may be present based on the current vehicle sensor data 6*b* at step 28.

In some examples, the method 20 may comprise obtaining current vehicle sensor data 6*b* from a vehicle 1 at step 26, and calculating whether there are any likely defects which may be present based on the current vehicle sensor data 6*b* at step 28, and also comprise obtaining current inspection report data 14*b* from a driver input device 13 associated with the vehicle 1 at step 30, and calculating whether there are any likely defects which may be present based on the current inspection report data 14*b* at step 32.

In various examples, the likely defects are checklist items (e.g. as defined by local legal requirements), and the suggested action is to perform a check of the vehicle component related to the checklist item.

The method 20 will now be explained further by way of two examples.

A first example follows the steps 22→24→26→28→33. At step 22, historical data is collected as discussed above. At step 24, the algorithm is trained to recognize correlations in the historical data, including correlations between the historical vehicle sensor data 6*a* and the historical inspection report data 14*a*. In an example of this first type of correlation, the historical vehicle sensor data 6*a* is in the form of DTCs, and the historical inspection report data 14*a* is in the form of checklist entries. In this training step, the algorithm recognizes a correlation between the DTC "BS, 7300, Axle modulator of the rear axle is faulty" and an inspection report of a defect with the tires. This correlation is likely to be present because the axle modulator modulates the wheel brake pressure across the axle, and so if the axle modulator is faulty, then the wheels may be being braked unevenly, causing uneven tire wear. At step 26, current vehicle sensor data 6*b* is obtained from the vehicle 1, and the DTC "BS, 7300, Axle modulator of the rear axle is faulty" is present in the current vehicle sensor data 6*b*. Therefore, at step 28, the algorithm identifies that there is a likely defect with the tires based on the DTC which is present in the current vehicle sensor data 6*b*. At step 33, an indication is provided to the driver at the driver output terminal 15 that there is a likely defect with the tires, and a suggested action is provided which in this example is to perform an inspection of the tires.

A second example follows the steps 22→24→30→32→33. At step 22, historical data is collected as discussed above. At step 24, the algorithm is trained to recognize correlations in the historical data, including correlations within the historical inspection report data 14*a*. In an example of this second type of correlation, the historical inspection report data 14*a* is in the form of checklist entries. In this training step 24, the algorithm recognizes a correlation between a checklist entry of a defect with the steering, and a checklist entry of a defect with the tires. This correlation may be present because under-inflated front tires could make the steering feel heavy, or uneven inflation between the front tires may cause the steering to pull to the left/right. At step 30, current inspection report data 14*b* is obtained from the vehicle 1, and a checklist entry reporting a defect with the steering is present in the current inspection report data 14*b*. Therefore, at step 32, the algorithm identifies that there is a likely defect with the tires based on the checklist entry which is present in the current inspection report data 14*b*. At step 33, an indication is provided to the driver at the driver output terminal 15 that there is a likely defect with the tires, and a suggested action is provided which in this example is to perform an inspection of the tires.

FIG. 4 shows method steps associated with the indication of likely defects to a driver, and the continued learning of the algorithm. At step 41, indications of the likely defects and resulting suggested actions are provided to the driver at the driver output terminal 15. At step 43, the driver output terminal 15 is configured to request that the driver updates the current inspection report data 14*b* based on the suggested actions. If the driver output terminal 15 has indicated to the driver that there is likely to be a defect with a vehicle component, and has suggested the action of performing a check on the vehicle component, the driver output terminal 15 will request that the driver confirms that they have performed a check on the component, and updates the current inspection report data 14*b* to confirm whether or not a defect has been identified by the driver. This confirmation may be provided by means of a tick box, and/or the driver may be required to provide a signature to confirm that they have performed the inspection. Further, in embodiments, it may be requested that the driver uploads a photograph of the checked vehicle component at the driver input device. In embodiments, an ID code (such as a QR code) may be present at or near the vehicle component which the driver will be required to scan with the driver input device 13 to confirm that they have checked the vehicle component. Further, it is envisaged that it may be requested that the driver performs a manual reading of a sensor or gauge associated with the checklist item to verify whether or not a defect is present. In such embodiments, it may be necessary for the driver to take a reading from a sensor or gauge and enter the reading into the driver input device 13 manually. Additionally or alternatively, where there are connected smart sensors installed on the vehicle 1, for example smart tire pressure monitoring system (TPMS) sensors, it may be possible for server device to automatically request further readings from the smart sensors. For example, where a smart sensor is associated with a vehicle component related to a likely defect, the server device may request further readings from that sensor in order to verify whether or not a defect exists for that vehicle component. Alternatively, it may be necessary for the driver to take a reading directly from the smart sensor using the driver input device 13, for example by initiating a wireless connection between the driver input device 13 and the smart sensor.

At step 45, the updated current inspection report data 14*b*, which will indicate whether or not the indicated likely defect corresponded to an actual defect which has been identified by the driver, is sent to the server 7 which adds the data to the historical data. The current vehicle sensor data 6*b* is also added to the historical data by the server 7. As such, the algorithm can continue to learn from the updated current inspection report data 14*b* which is input by the driver in response to the suggested actions suggested by the algorithm. In embodiments, the updated current inspection report data 14*b* and/or the current vehicle sensor data 6*b* is grouped using a mapping matrix, as discussed above, before being added to the historical data.

FIG. 5 illustrates a checklist presented to a driver on the driver output terminal 15. In the illustrated embodiment, a smart phone 50 provides both the driver input device 13 and the driver output terminal 15, and the checklist is provided to the driver by means of an application which is installed on the smart phone 50.

Figure 6:
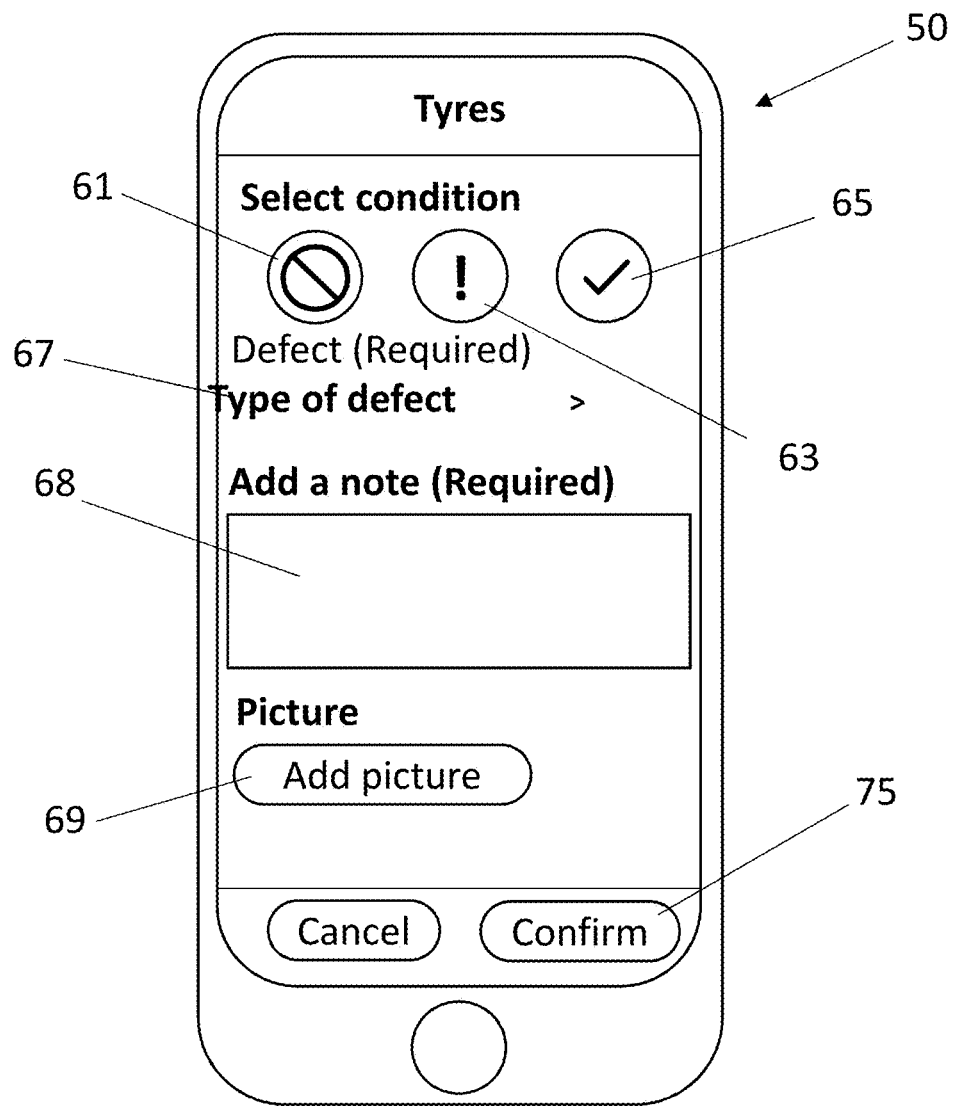
FIG. 6 shows an input screen presented on a driver input device.

FIG. 6 illustrates an input screen presented to the driver on the smart phone 50. This input screen allows the driver to update the current inspection report data 14b, either as part of a regular legally mandated check, or in response to a suggested action to carry out an inspection of a vehicle component and update the current inspection report data 14b. Three options are presented to the driver, a "Not Applicable" icon 61 which may be used when the check is not applicable, for example if the checklist item relates to a trailer and the current vehicle is not carrying a trailer, a "Defect" icon 63 which the driver will use to indicate that a defect is present with the checklist item, and an "Okay" icon 65 which the driver will use to indicate that they have completed an inspection of the checklist item and not identified a defect. Further inputs are also available to the driver.

Figure 7:
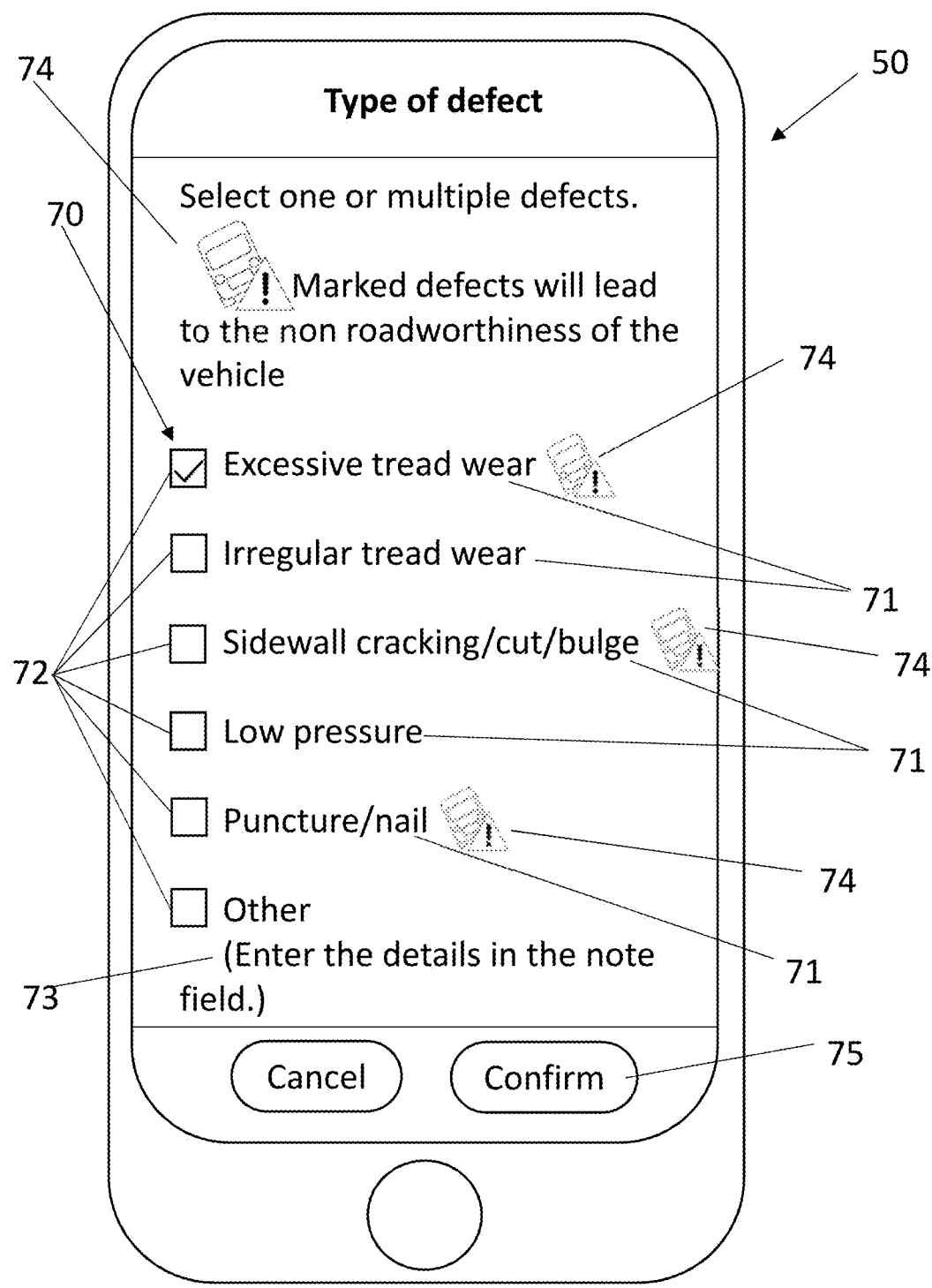
FIG. 7 shows a defect type menu presented on a driver input device.
Figure 7A:
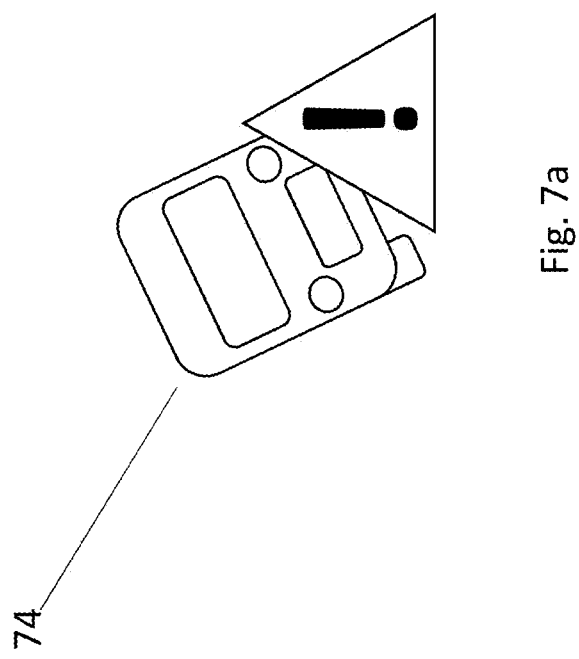
FIG. 7a shows a close up of an icon from the menu of FIG. 7.

If the driver indicates that a defect is present by selecting defect icon 63, then, in a preferred set of embodiments, they are required to input the type of defect using the "Type of defect" bar 67. Selecting the "Type of defect" bar 67 takes the driver to a "Type of defect" menu 70 shown in FIG. 7 which contains a plurality of pre-defined possible defects 71, as well as an "Other" option 73 which may be used when the present defect is not contained within the pre-defined possible defects. The driver is required to select which of the pre-defined defects 71 is present using the tick boxes 72, and to confirm their selection with the confirm icon 75. It can be seen in FIG. 7 that some of the pre-defined defects have a non-roadworthy icon 74. Pre-defined defects marked with this icon 74 are of non-roadworthiness severity, and will lead to the vehicle being deemed non-roadworthy. FIG. 7a shows the non-roadworthy icon 74 in close up view.

By limiting the driver's input (the inspection report data) to a list of pre-defined defects 71, the method of identifying likely defects is streamlined. If the inspection report data was limited only to indicating that there was a defect with a checklist item, i.e. a defect with the tire, but did not contain information about the nature of the defect, then the likely defects calculated by the algorithm would be less precise. Further, if the driver was able to provide details of the defect without constraints, and these details were added to the inspection report data, then the method 20 would need to contain some kind of interpretation step before the algorithm could look for correlations relating to the inspection report data.

Referring again to FIG. 6, options are provided for the driver to add a note relating to the defect in a note input box 68, and to add a picture of the vehicle component related to the checklist item using a picture input option 69. For the reasons discussed above, in the current embodiment, these additional details will not be included in the current inspection report data 14b which is sent to the server 7 to be added to the historical data, but they may be sent to a fleet operator, via the server 7, or via any other suitable means, and displayed on a fleet operator terminal 17 so that the fleet operator may carry out further verification, schedule maintenance, or book vehicle servicing if required.

Figure 8:
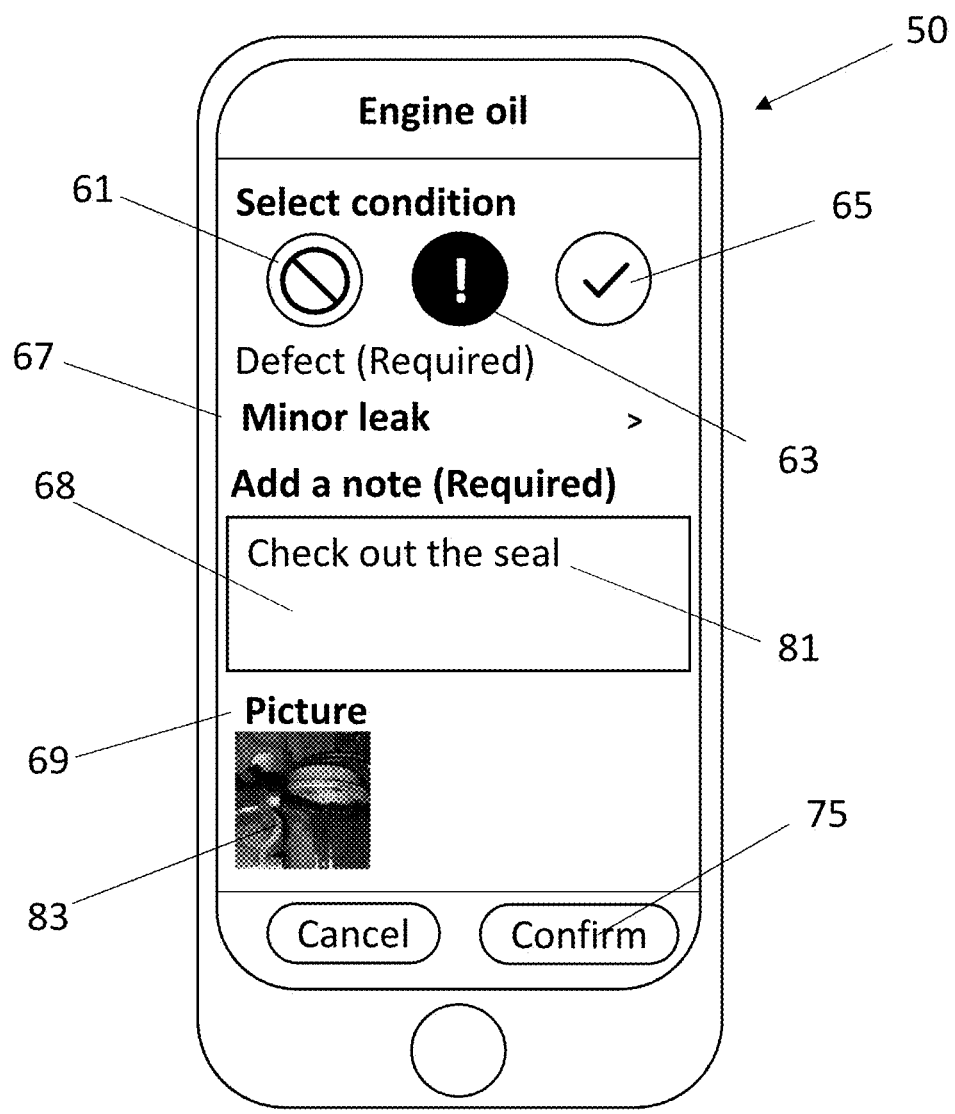
FIG. 8 shows an input screen as shown in FIG. 6 which has been completed by a driver.

FIG. 8 shows an input screen as shown in FIG. 6 which has been completed by a driver. In the illustrated example, the checklist item is the engine oil, the driver has indicated that there is a defect by selecting defect icon 63, has indicated that the type of defect is a minor leak by selecting the minor leak option from the pre-defined defects 71, has added a note 81 to check the seal in the note input box 68, and has added a picture 83 of the defect using the picture input option 69.

Figure 9:
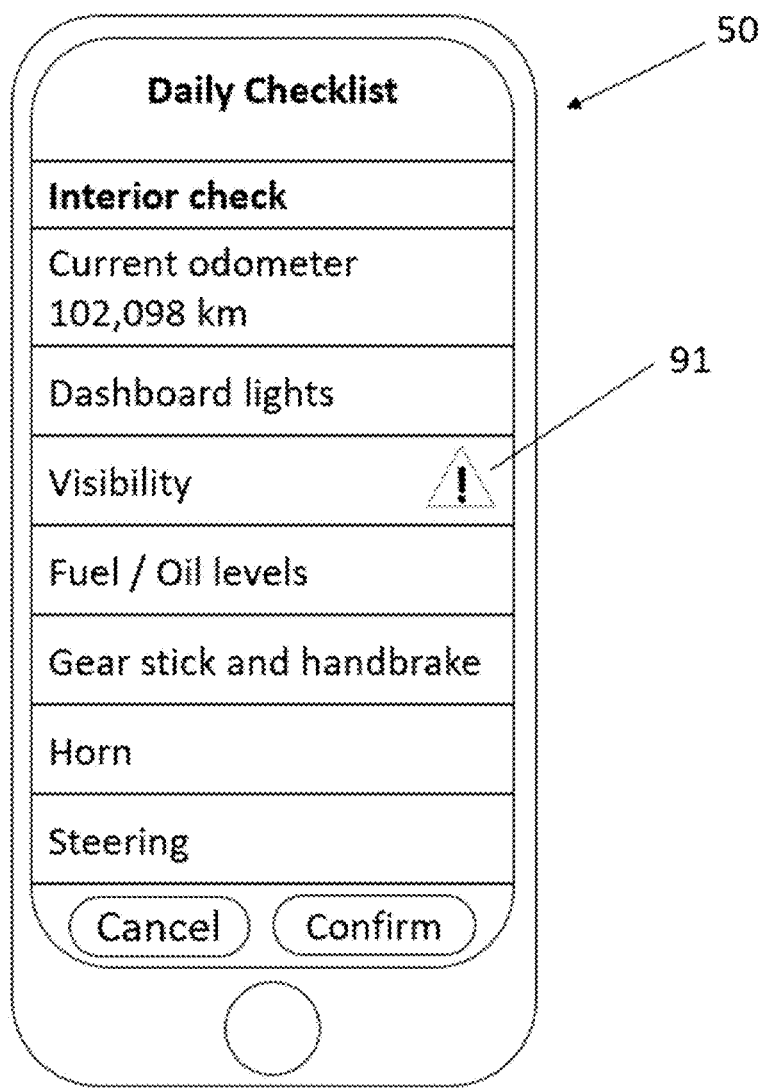
FIG. 9 shows a checklist as shown in FIG. 5, but with an example indication of a likely defect displayed.

FIG. 9 shows a checklist as shown in FIG. 5, but with an example indication of a likely defect given by means of a warning icon 91. The warning icon 91 notifies the driver that there is a calculated likely defect with the visibility checklist item, and the driver will be motivated to inspect this item carefully, or to prioritise this checklist item over other checklist items. The checklist seen in FIG. 9 can be displayed according to a display template selected at the server 7, based on the calculated likely defect(s), and sent to the smart phone 50. It is the display template that prioritises the display of the "Visibility" checklist item on page one of the inspection report and adds the warning icon 91. A different display template can be selected and sent to the smart phone 50, or the display template can be updated, depending on the calculated likely defect(s) and their associated checklist items.

Figure 10:
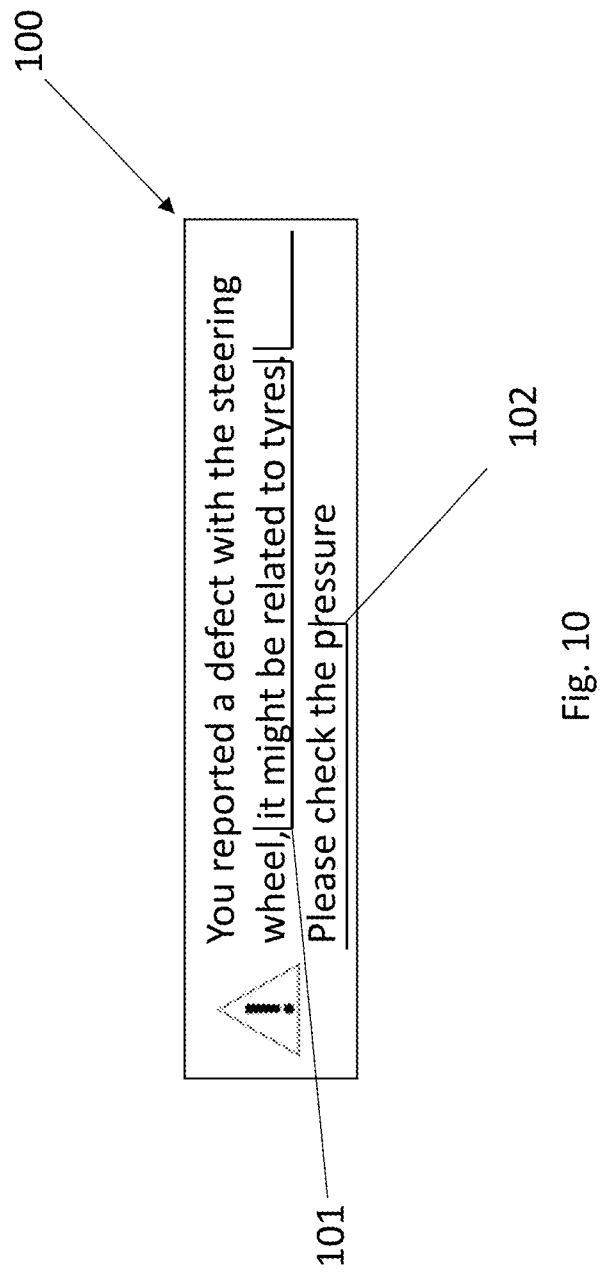
FIG. 10 shows a message which may be provided to the driver at the driver output terminal.

Indications and suggested actions may be provided to the driver via the driver output terminal 15 in different forms, such as messages which may appear as notifications. FIG. 10 shows an example message 100 which may be provided to the driver at the driver output terminal 15. The message 100 contains an indication portion 101 which provides the indication to the driver, and a suggested action portion 102 which provides the suggested action to the driver. In the case of message 100, this message may be presented to the driver on the driver output terminal 15 at step 33 of the second example discussed above in relation to FIG. 2. The method has calculated that based on current inspection report data 14b containing a report of a defect with the steering, that there is a likely defect with the tire pressure, and so the suggested action is to check the pressure. It can therefore be seen in FIG. 10, that the indication portion 101 of the message 100 reads "it might be related to tires", and the suggested action portion 102 of the message 100 reads "Please check the pressure".

In the illustrated embodiments, the indication is given to the driver as an icon or as part of a notification message, but the skilled person will understand that the indication could be provided in any suitable manner. In embodiments, a prioritised checklist may be presented to the driver on the driver output terminal 15, wherein the prioritised checklist orders checklist items according to whether or not a likely defect has been identified with the checklist item, and further according to the severity of the likely defect. In such an embodiment, checklist items with calculated likely defects which would result in the vehicle 1 being deem non-roadworthy may be presented to the driver first. Suggested actions may similarly be provided in any suitable manner.

In the illustrated embodiment, the historical data is continuously updated with the updated current inspection report data 14b obtained from the driver input device 13. It is envisaged that, in embodiments, the historical data may also be updated with data related to the actions of the fleet manager, such that the algorithm may learn how the fleet manager responds to defects, and may adapt its suggested actions accordingly. For example, if the fleet manager always schedules a service in response to a particular defect, the algorithm may present scheduling a service as the suggested action when that defect is identified and confirmed by the driver.

Further, in the illustrated embodiment, the historical data contains historical vehicle sensor data 6a and historical inspection report data 14a, but in embodiments, it is envisaged that other data may be present in the historical data which may be considered by the algorithm. For example, the algorithm may consider data from a vehicle manufacturer which may contain common defects with a particular model of vehicle. The algorithm may therefore provide an indication of said common defect to the driver, and/or instruct the driver to pay special attention to, or more frequently check the commonly defective checklist item. Additionally or alternatively, the data may comprise geographical data. For example, if the vehicle 1 is operating in an area where the roads are known to be of bad quality, then the algorithm may provide an indication to the driver that defects are more likely with the tires and suspension, and/or instruct the driver to pay special attention to, or more frequently check the checklist items corresponding to the tires and suspension.

In any of the embodiments described above, the historical vehicle sensor data 6a and the historical inspection report data 14a may comprise data collected over at least six months from a plurality of vehicles such as for example twenty vehicles. The time span across which the historical data is collected may depend on the number of vehicles in the plurality of vehicles, and on the typical usage of the plurality of vehicles and how their usage varies over time.

While the invention has been described in detail in connection with only a limited number of embodiments, focusing on the case where the assets in question are vehicles, it should be readily understood that the invention is not limited to such disclosed embodiments, and the assets could be any assets on which it is necessary for user checks to be performed. The invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for identifying likely defects with an asset within a fleet of assets, the system comprising:
    one or more sensors configured to detect asset sensor data of the fleet of assets;
    one or more user input devices associated with said fleet of assets configured to receive inspection report data of the fleet of assets;
    one or more user output terminals associated with said fleet of assets; and
    a server device, wherein the server device is configured to:
        collect historical data comprising:
            historical asset sensor data generated by the one or more sensors on the fleet of assets; and
            historical inspection report data from the one or more user input devices associated with the fleet of assets;
        train an algorithm to identify correlations between data points in the historical asset sensor data and data points in the historical inspection report data, to detect when certain asset sensor data in the historical data has occurred at the same time as certain inspection report data in the historical data;
        obtain current asset sensor data from the one or more sensors on a given asset within the fleet of assets;
        calculate, using the trained algorithm, one or more likely defects which may be present on the given asset based on the identified correlations in the historical data, and based on the obtained current asset sensor data, by using the identified correlations to determine when the current asset sensor data has occurred at the same time as certain inspection report data in the historical data; and
        send said one or more likely defects to a user output terminal associated with the given asset,
    wherein said user output terminal is configured to display an indication of said one or more likely defects.

2. The system of claim 1, wherein the user input device associated with the given asset comprises said user output terminal associated with the given asset.

3. The system of claim 1, wherein the server device is configured to:
    select a display template from a memory of the server device based on said one or more likely defects and send the display template to the user output terminal,
    wherein the display template prioritises the display of one or more checklist items in the inspection report data dependent on said one or more likely defects.

4. The system of claim 3, wherein the server device is configured to dynamically update the display template as new current inspection report data and/or current asset sensor data is received.

5. The system of claim 1, wherein the server device is configured to calculate a suggested action based on said one or more likely defects, and send the suggested action to the user output terminal, and wherein the user output terminal is configured to display the suggested action.

6. The system of claim 5, wherein the server device is further configured to calculate a priority list of suggested actions to be provided at the user output terminal based on said one or more likely defects.

7. The system of claim 5, wherein the suggested action is for the user to inspect one or more components on the asset and update the current inspection report data at the user input device.

8. The system of claim 1, wherein one or more of the sensors is a smart sensor, and the server device is configured to instruct a smart sensor associated with an asset component related to a likely defect to provide sensor data to the server device to verify the current condition of the asset component.

9. The system of claim 1, wherein the fleet of assets is a plurality of vehicles which are all of the same vehicle type.

10. The system of claim 1, wherein the asset sensor data comprises diagnostic trouble codes as specified by one or more asset manufacturers to identify asset defects.

11. The system of claim 1, wherein the server device is configured to group the asset sensor data according to an asset component to which the asset sensor data relates and group the inspection report data according to an asset component to which the inspection report data relates.

12. The system of claim 1, wherein the server device is configured to use the algorithm to identify correlations between historical asset sensor data and historical inspection report data.

13. The system of claim 1, wherein the server device is configured to use the algorithm to identify correlations within the historical inspection report data.

14. The system of claim 1, wherein the server device is configured to add current asset sensor data to the historical data to generate new historical data, and to train the algorithm to recognize correlations in the new historical data, wherein the algorithm comprises a learning algorithm.

15. The system of claim 1, wherein the server device is configured to use the algorithm to identify correlations between historical asset sensor data and historical inspection report data.

16. A system for identifying likely defects with an asset within a fleet of assets, the system comprising:
one or more sensors configured to detect asset sensor data of the fleet of assets;
one or more user input devices associated with said fleet of assets and configured to receive inspection report data of the fleet of assets;
one or more output terminals associated with said fleet of assets; and
a server device, wherein the server device is configured to:
collect historical data comprising:
historical asset sensor data generated by the one or more sensors on the fleet of assets; and
historical inspection report data from the one or more user input devices associated with the fleet of assets;
train an algorithm to identify correlations between data points in the historical asset sensor data and data points in the historical inspection report data, to detect when certain asset sensor data in the historical data has occurred at the same time as certain inspection report data in the historical data;
obtain current inspection report data from a user input device associated with a given asset within the fleet of assets;
calculate, using the trained algorithm, one or more likely defects which may be present on the given asset based on the identified correlations in the historical data, and based on the obtained inspection report data, by using the identified correlations to determine when the current inspection report data has occurred at the same time as certain asset sensor data in the historical data; and
send said one or more likely defects to a user output terminal associated with the given asset,
wherein said user output terminal is configured to display an indication of said one or more likely defects.

17. The system of claim 16, wherein the server device is configured to add current inspection report data to the historical data to generate new historical data, and to train the algorithm to recognize correlations in the new historical data, wherein the algorithm comprises a learning algorithm.

18. The system of claim 16, wherein the server device is configured to use the algorithm to identify correlations between historical asset sensor data and historical inspection report data.

19. A method for identifying likely defects with an asset within a fleet of assets, the fleet of assets comprising one or more sensors configured to detect asset sensor data, and each of the assets associated with one or more user input devices configured to receive inspection report data of the fleet of assets and with one or more user output terminals, the method comprising:
collecting historical data comprising:
historical asset sensor data generated by the one or more sensors on the fleet of assets; and
historical inspection report data from the one or more user input devices associated with the fleet of assets;
training an algorithm to identify correlations between data points in the historical asset sensor data and data points in the historical inspection report data, to detect when certain asset sensor data in the historical data has occurred at the same time as certain inspection report data in the historical data;
obtaining current asset sensor data from the one or more sensors on a given asset within the fleet of assets;
calculating, using the trained algorithm, one or more likely defects which may be present on the given asset based on the identified correlations in the historical data, and based on the obtained current asset sensor data, by using the identified correlations to determine when the current asset sensor data has occurred at the same time as certain inspection report data in the historical data; and
sending said one or more likely defects to a user output terminal associated with the given asset,
wherein said user output terminal is configured to display an indication of said one or more likely defects.

20. A method for identifying likely defects with an asset within a fleet of assets, the fleet of assets comprising one or more sensors configured to detect asset sensor data, and each of the assets associated with one or more user input devices configured to receive inspection report data of the fleet of assets and with one or more user output terminals, the method comprising:
collecting historical data comprising:
historical asset sensor data generated by the one or more sensors on the fleet of assets; and
historical inspection report data from the one or more user input devices associated with the fleet of assets;
training an algorithm to identify correlations between data points in the historical asset sensor data and data points in the historical inspection report data, to detect when certain asset sensor data in the historical data has occurred at the same time as certain inspection report data in the historical data;
obtaining current asset sensor data from the one or more sensors on a given asset within the fleet of assets;
calculating, using the trained algorithm, one or more likely defects which may be present on the given asset based on the identified correlations in the historical data, and based on the obtained current inspection report data, by using the identified correlations to determine when the current inspection report data has occurred at the same time as certain asset sensor data in the historical data; and
sending said one or more likely defects to a user output terminal associated with the given asset,
wherein said user output terminal is configured to display an indication of said one or more likely defects.

* * * * *